Patented Sept. 6, 1949

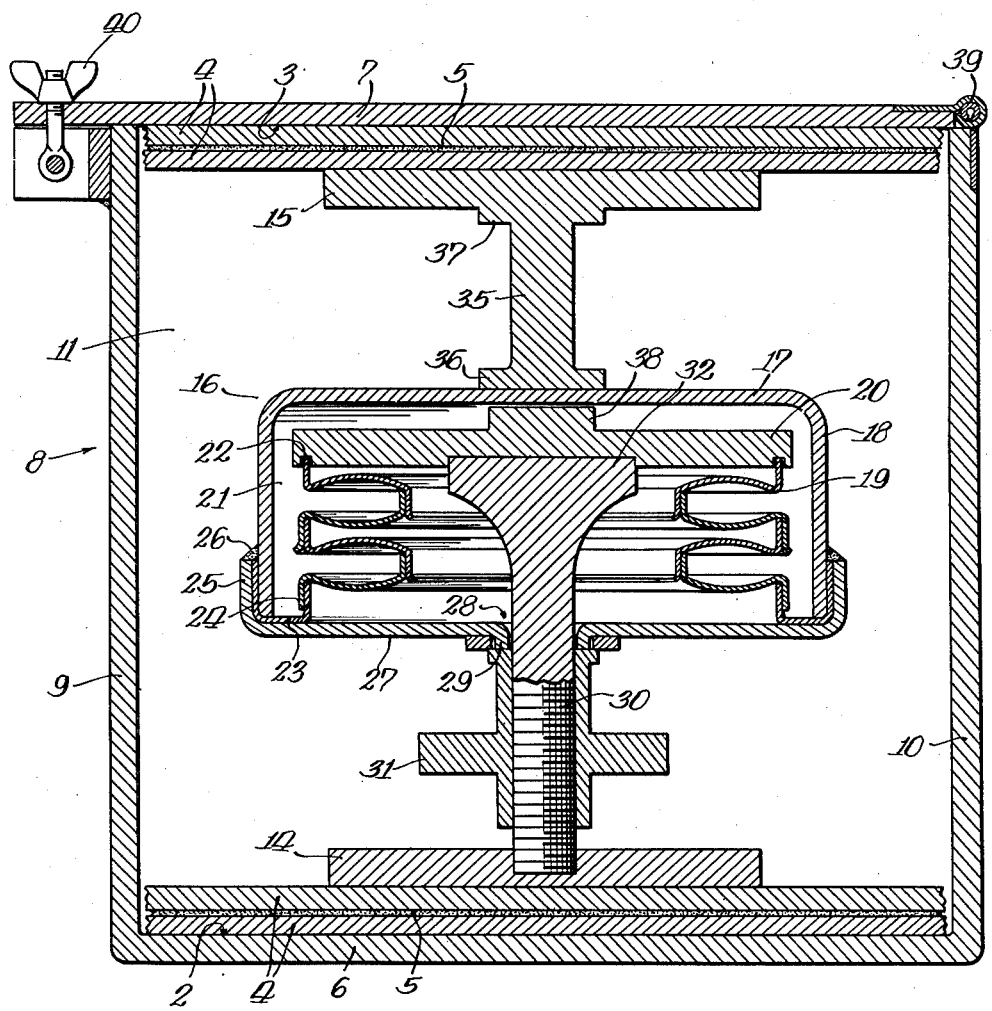

2,481,216

UNITED STATES PATENT OFFICE 2,481,216

PRESSURE AND HEAT-TREATING DEVICE

Walter C. Hasselhorn, Chicago, Ill., assignor to Cook Electric Company, Chicago, Ill., a corporation of Illinois Application January 13, 1945, Serial No. 572,689

7 Claims. (Cl. 154—1)

This invention relates to a pressure and heat treating device capable of a variety of uses.

The invention is directed to a novel form of structure of the type mentioned having an unique design of pressure applicator.

Welding of parts together by the heat curing of a cementitious material may be mentioned as one desirable application of the invention.

One of the objects of the invention is to provide in this novel form of structure a heat or vapor motor as the pressure applicator.

A further object of the invention is to dispose the heat or vapor motor in the heat treating chamber of the structure so that it will be expansible by the heat thereof to apply the necessary pressure to effect the proper weld between the parts being joined.

A still further object of the invention is to provide an unique type of vapor or heat motor construction having relatively movable ends and relatively adjustable connections between these ends and pressure plates adapted to bear against the parts being joined, the arrangement providing for a thrust in opposite directions to provide for simultaneous welding of several units at one time if so desired. Thus the vapor or heat motor is novelly mounted or carried within the structure and the advantage of the action of a heat motor providing a thrust in opposite directions utilized to increase the capacity and the efficiency of the structure.

In its most specific aspects, the invention is directed to certain specific features which provide for a simple and sturdy construction capable of quick and easy handling.

To this end, the heat treating chamber may have opposed surfaces against which the members to be welded are positioned and the pressure plates applied and held thereagainst by the vapor motor. An adjustment between the vapor motor and the pressure plates compensates for thickness variations of the members to be welded and the layer of material to be applied therebetween, thereby assuring that the various parts will be properly related in the assembly prior to the treatment.

Other objects and advantages of the invention will be apparent from the following detail description when taken in connection with the accompanying drawing, in which The figure of the drawing is a tranverse sectional view of a preferred embodiment of the invention disclosed herein.

In the drawing, wherein, for the purpose of illustration, there is shown a preferred embodiment of the invention, the device includes one or more material receiving surfaces 2 and 3 against or upon which a number of layers of material 4 are positioned, which layers of material 4 are adapted to be welded or secured together by a spread of cementitious material 5 therebetween or by cementitious material impregnated in the layers 4 or being a part of the material of such layers. Material 4 is merely representative of the work to be treated and may be of different form or shape. Surfaces 2 and 3 may be upon any suitable structural part of the device. As shown in the drawing, these surfaces are a part of wall members 6 and 7 forming the casing or housing 8 which may include the side walls 9 and 10.

The casing or housing 8 is, in the present instance, shown as a box-like unit provided with a heat treating chamber 11 adapted to be heated by any conventional means. This conventional means may include electrical resistance coils or the like inserted in the chamber 11, or it may include inserting the entire unit in an oven or furnace to cause the heat to penetrate the walls in order to heat chamber 11. Whether the heat is applied so as to be conducted inwardly through the walls or is generated in the chamber 11 itself is immaterial.

Pressure plates 14 and 15 are adapted to hold material 4 upon surfaces 2 and 3. These plates are held apart and they apply pressure to material 4 by a pressure applicator 16 adapted to be influenced by the heat of chamber 11.

Pressure applicator 16 comprises an expansible and contractible vessel 17 having a volatile fluid therein, such as benzol, toluene, or the like. Vessel 17 includes a cup 18, a flexible wall 19 and an end plate 20. Flexible wall 19 is preferably in the form of a bellows adapted to be compressed upon expansion or vaporization of the fluid in the fluid chamber 21, which is formed by these parts. Bellows 19 may be the sectional type suitably joined together at the periphery of the plates forming the same, as by brazing or soldering, and also at the end plate 20 and the cup 18. Plate 20 is recessed at 22 to receive one edge of the bellows. This edge may be soldered or brazed in recess 22. The opposed edge of the bellows is joined to a channel shaped annular member 23 by a flange-like engagement at 24, either being brazed or soldered, the opposite leg of member 23 being disposed between the cup 18 and an upturned rim 25 of member 27 and hermetically sealed at 26. Thus the fluid chamber 21 of the vessel 17 is formed between cup 18 and bellows 19.

Member 27 is also in the form of a cup and is oppositely arranged with respect to cup 18. Its center is apertured at 28 with a down turned flange 29 so that a threaded bolt 30 will extend therethrough. Pressure plate 14 is threadedly carried upon the lower end of bolt 30, while a knurled draw-up screw 31 is carried by bolt 30 to provide an adjustment that may be initially made during the assembly to hold the pressure plates 14 and 15 against material 4 with the vapor motor 16 interposed. This is accomplished by threading the draw-up nut 31 toward flange 29 to cause a withdrawal of bolt 30 from out of plate member 27 to increase the effective length of the connection between the pressure plates 14 and 15 and the vapor motor 16. The upper end of bolt 30 is provided with a head 32 secured by a drive fit, or otherwise as by welding or keying, to plate 20 so that withdrawal of bolt 30 will cause plate 20 to compress bellows 19 and enlarge fluid chamber 21. The opposite action takes place when draw-up nut 31 is threaded downwardly along bolt 30. Bolt 30 will move into the vapor motor housing by reason of the spring action of bellows 19 so that the effective length of the connection between the pressure plates 14 and 15 and the vapor motor 16 may be decreased. A decrease of the connection's length will permit removal of the pressure plates 14 and 15 and the vapor motor 16 so that the work may be removed from against surfaces 2 and 3.

Pressure plate 15 may be held against the work by the vapor motor 16 through the medium of a pedestal 35 having enlarged bases 36 and 37 to provide increased bearing surfaces therefor at the ends. Any design of connection may of course be provided to do the work necessary. Pedestal 35 may be integrally formed with pressure plate 15 at its head 37, or these may be separate parts. It will be noted at this point that plate 20 has an abutment at 38 which functions to maintain plate 20 spaced from cup 18 in order not to close fluid chamber 21 at this point.

As previously stated, the construction of casing or housing 8 may vary. It may be a complete enclosure providing chamber 11 as a closed chamber or it may be an open framework so that chamber 11 merely constitutes a part of another chamber in which the casing or housing 8 is inserted during the heat treatment. Wall 7 may be hinged at 39 and held in locked position at 40 during the time the pressure applicator 16 applies pressure to plates 14 and 15. In any event, the walls of the casing 8 may be so arranged that the material 4 may be easily and readily inserted against surfaces 2 and 3 irrespective of the shape or form or nature of this material 4 and the purpose to which it may be put.

Hinging wall 7 at 39 has the further advantage of permitting quick removal of the work, whether treated at both ends 6 and 7 or at one end only, by withdrawing the heat motor unit 16 and the pressure plates 14 and 15 when this wall 7 is opened. This will permit the heat motor unit 16 to cool outside of chamber 11 and avoid the delay of waiting for the same to cool by immediately using another like unit for the next operation. Hence, by having a number of heat motor units available, continued use of the apparatus will be possible and any delay ordinarily necessary in a heating device in order to permit cooling may be avoided. This is one of the advantages of the type of pressure applicator disclosed herein.

It will be apparent that the adjustment provided by draw-up screw 31 may be used to predetermine or vary the pressure exerted by vapor motor 16 against pressure plates 14 and 15. A predetermined quantity of volatile fluid in chamber 21 may be used to produce a given pressure at a given temperature, or chamber 21 may be completely filled and its expansion at predetermined temperatures utilized to produce the desired working pressures. These working pressures may vary according to the materials 4 and the cementitious material 5 used. The use to which the device shown herein is put will also determine the temperature and pressure employed. The volatile fluid in chamber 21 will be influenced by the heat of chamber 11 irrespective of how the heat may be produced. This fluid will either vaporize or expand and cause bellows 19 to contract whereby to exert pressure in opposite directions against pressure plates 14 and 15. The housing 8 is merely illustrative of a structure capable of receiving material 4 during the heat treatment and of placing vapor motor 16 therebetween to be influenced by the heat of this treatment and maintain the desired pressure upon the material 4 during the period of the treatment.

It will be obvious that the present device presents the unique advantage of coordinating the pressure produced with the heat generated whereby both will exist as a concomitant of each other and thereby prevent an ineffective curing action where pressure is a necessary factor.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for curing cementitious material to weld a plurality of members together under pressure comprising a heat treating chamber in which said members are positioned for treatment, opposed walls against which said members are adapted to be pressed upon one another during treatment, a pair of pressure plates acting in opposite directions to press said members upon one another against said opposed walls, a sealed expansible chamber adapted to contain an expansible fluid and be disposed between said pressure plates, said expansible chamber being subject to the heat of said heat treating chamber to expand said fluid and connections between said pressure plates and opposite ends of said expansible chamber for transmitting the expansible action of said fluid and said chamber against said pressure plates.

2. Apparatus for curing cementitious material to weld a plurality of members together under pressure comprising a heat treating chamber in which said members are positioned for treatment, opposed walls against which said members are adapted to be pressed upon one another during treatment, a pair of pressure plates acting in opposite directions to press said members upon one another against said opposed walls, a sealed expansible chamber adapted to contain an expansible fluid and be disposed between said pressure plates, and connections between said pressure plates and opposite ends of said expansible chamber for transmitting the expansible action of said fluid and said chamber against said pressure plates, said expansible chamber being subject to the heat of said heat treating chamber to expand said fluid, one of said connections including means to regulate said expansible action and the consequent pressure exerted against said pressure plates.

3. Apparatus for curing cementitious material to weld a plurality of members together under pressure comprising a heat treating chamber in which said members are positioned for treatment, opposed walls against which said members are adapted to be pressed upon one another during treatment, an expansible fluid device, pressure plates connected together by said expansible fluid device, said plates and said expansible fluid device being removable as a unit from the heating chamber, and means to vary the distance between said pressure plates to provide an adjustment compensating for different thicknesses of said members to be welded.

4. Apparatus for curing cementitious material to weld a plurality of members together under pressure comprising a heat treating chamber in which said members are positioned for treatment, opposed walls against which said members are adapted to be pressed upon one another during treatment, pressure plates adapted to apply pressure against said members, a mechanical connection between said plates, said connection including a pair of opposed cups, a flexible wall sealed to at least one of said cups to form a closed chamber adapted to contain an expansible fluid, and a member movable by said flexible wall.

5. Apparatus for curing cementitious material to weld a plurality of members together under pressure comprising a heat treating chamber in which said members are positioned for treatment, opposed walls against which said members are adapted to be pressed upon one another during treatment, pressure plates adapted to apply pressure against said members, a mechanical connection between said plates, said plates and said mechanical connection being removable as a unit from said heat treating chamber, said connection including a pair of opposed cups, a flexible wall sealed to at least one of said cups to form a closed chamber adapted to contain an expansible fluid, and a member movable by said flexible wall.

6. Apparatus for curing cementitious material to weld a plurality of members together under pressure comprising a heat treating chamber in which said members are positioned for treatment, opposed walls against which said members are adapted to be pressed upon one another during treatment, pressure plates adapted to apply pressure against said members, a mechanical connection between said plates, said connection including a pressure exerting device adapted to exert a pressure upon said pressure plates proportionately to the change of temperature of said heat treating chamber.

7. Apparatus for curing cementitious material to weld a plurality of members together under pressure comprising a heat treating chamber in which said members are positioned for treatment, opposed walls against which said members are adapted to be pressed upon one another during treatment, pressure plates adapted to apply pressure against said members, a mechanical connection between said plates, said connection including a pressure exerting device adapted to exert a pressure upon said pressure plates proportionately to the change of temperature of said heat treating chamber, said connection including said power actuator being self-contained within said heat treating chamber during heat treatment.

WALTER C. HASSELHORN.

REFERENCES CITED

The following references are of record in the file of this patent:

UNITED STATES PATENTS

| Number | Name | Date |
| --- | --- | --- |
| 906,700 | Fulton | Dec. 15, 1908 |
| 1,887,550 | Fix et al. | Nov. 15, 1932 |
| 1,961,044 | Hawes et al. | May 29, 1934 |
| 2,202,042 | Blount | May 28, 1940 |
| 2,271,307 | Ray | Jan. 27, 1942 |
| 2,307,985 | Beasecker | Jan. 12, 1943 |
| 2,312,332 | Gramelspacher | Mar. 2, 1943 |
| 2,358,483 | Tilden | Sept. 19, 1944 |
| 2,363,933 | Bendix | Nov. 28, 1944 |
| 2,435,866 | Bilhuber | Feb. 10, 1948 |

FOREIGN PATENTS

| Number | Country | Date |
| --- | --- | --- |
| 345,976 | Great Britain | Sept. 28, 1929 |